United States Patent [19]

Mamontov et al.

[11] Patent Number: 5,038,106

[45] Date of Patent: Aug. 6, 1991

[54] DETECTOR OF METALLIFEROUS OBJECTS HAVING TWO PAIRS OF RECEIVING LOOPS SYMMETRICAL AND ORTHOGONAL TO A DRIVING LOOP

[76] Inventors: Jury M. Mamontov, ulitsa Rossoshanskaya, 6, korpus 4, kv. 18; Vladimir R. Andrianov, Zarevy proezd, 3, kv. 19; Vladimir J. Danilov, ulitsa Mikhnevskaya, 17, kv. 138; Igor G. Romanov, ulitsa Polyarnaya, 52, korpus 3, kv. 409; Boris S. Chubarov, Zeleny prospekt, 103, kv. 27; Ivan A. Voblov, ulitsa Konenkova, 14, kv. 265; Vladimir V. Melnikov, ulitsa B. Kamenschiki, 19, kv. 52, all of Moscow, U.S.S.R.

[21] Appl. No.: 484,430

[22] Filed: Feb. 23, 1990

[51] Int. Cl.$^5$ ............... G01V 3/11; G01V 3/165; G01R 33/12; G01N 27/72
[52] U.S. Cl. ..................... 324/329; 324/225; 324/243
[58] Field of Search ............... 324/326-329, 324/67, 225, 233, 234, 239-243, 207.12

[56] References Cited

U.S. PATENT DOCUMENTS 3,907,136 9/1975 Christides et al. ............... 324/67 X
4,091,322 5/1978 Stankoff ............................ 324/67 X

FOREIGN PATENT DOCUMENTS 1190330 11/1985 U.S.S.R. .

OTHER PUBLICATIONS

Induktsionnye Kabeleiskateli, Svyaz Publishers, Moscow, 1970, pp. 75-78.
Labor Saving H-Scope Model TW-5: 7/1/81: brochure from "The Grigsby Company Inc".

Primary Examiner—Gerard R. Strecker
Attorney, Agent, or Firm—Ladas & Parry

[57] ABSTRACT

The detector of metalliferous objects comprising an electrically coupled to an alternating voltage generator driving loop, rigidly fitted to two pairs of receiving loops, positioned at opposite sides of the driving loop, coaxial and parallel to one another. The receiving loops are connected to connected in series balancers, differential amplifiers, electric signal compensators with the control inputs thereof connected to the generator, selective amplifiers, data processors, logic OR gate, and signalling unit.

5 Claims, 6 Drawing Sheets

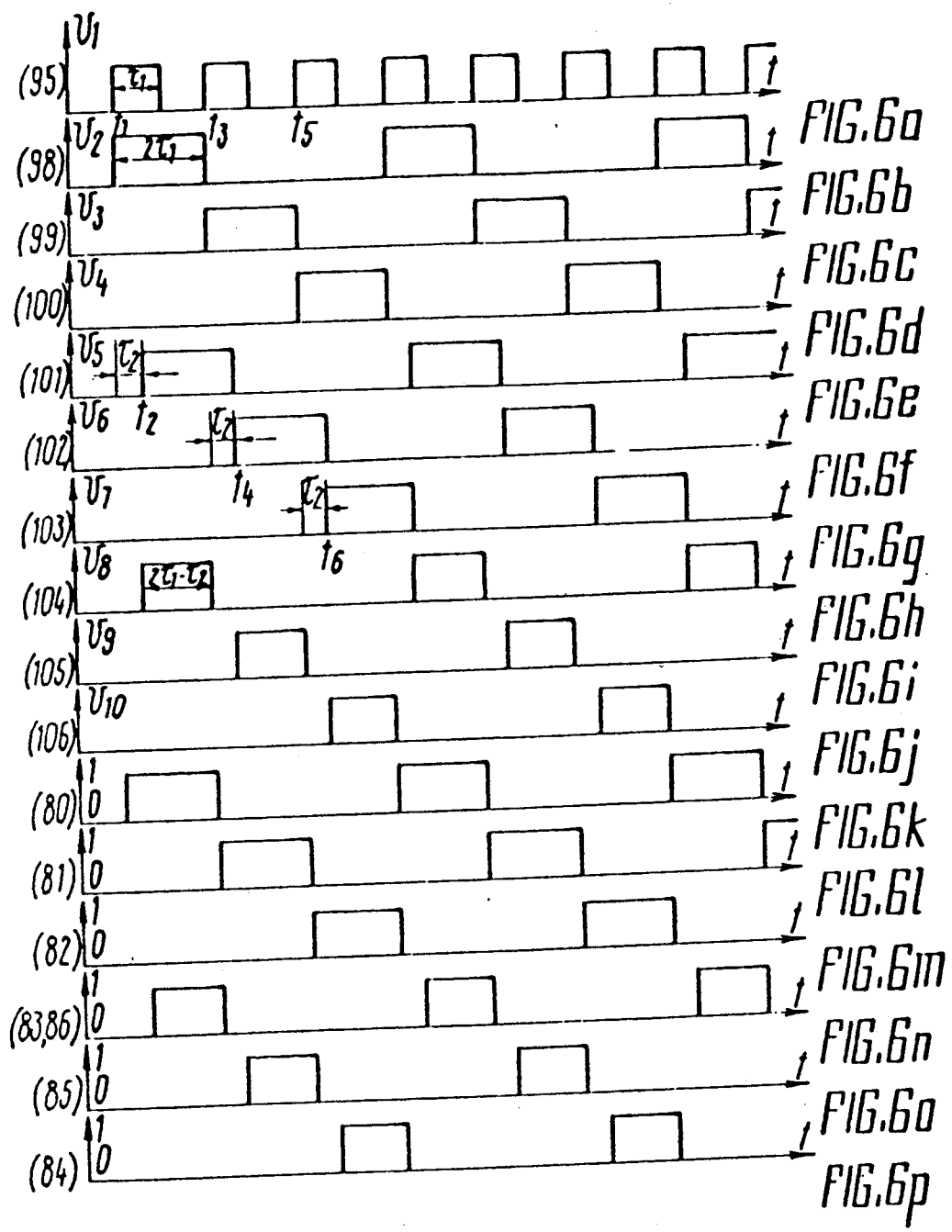

DETECTOR OF METALLIFEROUS OBJECTS HAVING TWO PAIRS OF RECEIVING LOOPS SYMMETRICAL AND ORTHOGONAL TO A DRIVING LOOP

FIELD OF THE INVENTION

The invention relates to the technology of detecting metalliferous objects with the aid of electromagnetic fields and, more specifically, to metalliferous objects detectors.

This invention can find wide application in various branches of industry and economy, such as civil engineering, geodesy, agriculture, engineering structures maintenance, archeology, geology, etc., to detect both mapped and unmapped metalliferous service lines and objects: pipelines, electric cables, geodetic datum marks, reinforced concrete slabs, covers of underground wells and other metalliferous objects, including those of non-ferrous metals.

This invention can also be used in woodworking, food industry, other industries, and in agriculture to detect metal inclusions in raw materials and fodder.

BACKGROUND OF THE INVENTION

Currently, the problem of detecting unmapped metalliferous objects, including those of non-ferrous metals, is an urgent one. One of the possible approaches to solving this problem is the use of small-size inductive devices, combining the functions of radiating an original electromagnetic field and receiving the secondary electromagnetic field induced by the metalliferous object irradiated by the original electromagnetic field of the device.

Known in the art are devices for detecting underground metalliferous objects (high frequency M 480 detector from Seba Dynatronic, FRG, and the TW-5 pipe and cable locator from Grigsby Co., USA) of like design and each comprising: a generator loaded by a driving loop, a receiver loop positioned orthogonally to this driving loop and loaded by connected in series selective amplifier, data processor and acoustic signalling unit. The device uses geometric cancelling of the signal induced in the receiving loop by the original electromagnetic field of the driving loop.

Functioning of these devices is based on creating an original electromagnetic field with the aid of the driving loop, this field propagating in the area being searched, and reception of a secondary electromagnetic field generated by the metalliferous object.

Such devices are highly susceptible to external interfering electromagnetic fields, including those from metalliferous objects and service lines in the vicinity of the search area, because they also generate secondary fields in response to irradiation by the original electromagnetic field of the driving loop.

Moreover, the reliability of detecting service lines located at an angle less than 20° to the direction of device movement is low, due to the low signal induced in the service lines by the driving loop.

Also widely known in the art are metalliferous objects detectors (V. F. Bakhmutsky. "Induktsionnye kabeleiskateli" (Inductive cable locators), 1970, Svyaz Publishers, pp. 75–78.—In Russian) comprising a driving loop and two rigidly fitted to it orthogonally and oppositely connected receiving loops mounted symmetrically to both sides of the driving loop. In one embodiment the driving loop is horizontal and the receiving loops are vertical, in another embodiment the loop orientation is opposite; the electric signal recording circuitry in both embodiments is identical and similar to that described herein above.

It should be noted, that the direction of the devices movement coincides with that of the rod connecting the receiving loops.

Such devices are characterized by a low immunity to external interfering electromagnetic fields and metalliferous objects in the proximity of the search area. This is due to the wide spacing of the receiving loops, necessary to attain sufficient sensitivity and degree of geometric cancelling. Furthermore, the reliability of locating service lines positioned at angles less than 20° is low, due in the first embodiment to low secondary fields from the service lines and in the second embodiment—to a low signal induced in the service line by the driving loop.

It should be noted, that the low interference immunity of all the herein above described detecting devices makes it impossible to use them installed onto a vehicle, which itself is a source of interference for such devices, so that the productivity of search work is low.

A higher productivity and interference immunity is featured by the metalliferous objects detector (SU, A, 1190330), comprising a driving loop, two rigidly fitted to it receiving loops mounted coaxially and parallel to one another and symmetrically and orthogonal to the driving loop located in the plane of the common axis of the receiving loops, an alternating voltage generator electrically coupled to the driving loop, and connected in series signal balancer for the receiving loop signals with the inputs thereof connected to the receiving loops, and differential amplifier with the output thereof connected to the data input of an electric signal compensator to cancel the effects of the original electromagnetic field of the driving loop on the receiving loops with the control input thereof electrically coupled to the alternating voltage generator and with the output thereof connected to the input of a selective amplifier, the output whereof is connected to a recorder and electrically coupled to a signalling unit.

The above mutual arrangement of the driving and receiving loops, constituting the inductive system of the device, allows a significant improvement in its interference immunity due to a practically equal signal level induced in the receiving loops by external electromagnetic field sources (power distribution lines, electrified railways, communications lines, etc.) and cancelling out these interference signals by oppositely connecting the two receiving loops.

This known in the art device features a narrow coverage, i.e. the area in which the receiving loops are capable of picking up the secondary electromagnetic field induced by a metalliferous object. As is known, the width of the coverage area is a function of the spacing between the receiving loops and is limited by a falling off of the interference immunity at greater spacings, accompanied by a higher sensitivity.

Moreover, if metalliferous objects (service lines) are at an angle less than 20° relative to the direction of searching, which is normal to the rod connecting the receiving and driving loops, the detection reliability is low due to the weak signal induced in the service line by the original electromagnetic field of the driving loop.

To improve the detection probability, the search area has to be scanned twice, at different orientation of the induction system relative to the direction of searching. However, even then the probability of detection is insufficient, because it is difficult to maintain the same search direction when scanning in the opposite direction, this being true both with manual scanning and when the detector is mounted onto a vehicle.

SUMMARY OF THE INVENTION

It is an objective of this invention to provide a metalliferous objects detector, characterized by a high search productivity.

Another objective of the invention is to improve the reliability of metalliferous objects detection.

These and other objects are achieved by a detector of metalliferous objects comprising a first driving loop generating an original electromagnetic field. First, second, third and fourth receiving loops receive the secondary electromagnetic field of a metalliferous object and are rigidly fitted to the driving loop. The first and second, third and fourth receiving loops are mounted in pairs coaxially and parallel to one another. The driving loop is located in the plane of the common axes of the first and second, third and fourth receiving loops symmetrical and orthogonal thereto. An alternating voltage generator has an output electrically coupled to the first driving loop. A first signal balancer to balance the signals from the first and second receiving loops, has inputs connected to the first and second receiving loops, and an output. A second signal balancer to balance signals from the third and fourth receiving loops, has inputs connected to the third and fourth receiving loops, and an output. A first differential amplifier, has an input connected to the output of the first signal balancer, and an output. A second differential amplifier, has an input connected to the output of the second signal balancer, and an output. A first electric signal compensator cancels the effect of the original electromagnetic field of the first driving loop on the first and second receiving loops, and has a data input connected to said output of the first differential amplifier, a control input electrically coupled to said alternating voltage generator, and an output. A second electric signal compensator cancels the effect of the original electromagnetic field of the first driving loop on the third and fourth receiving loops, and has a data input connected to aid output of the second differential amplifier, a control input electrically coupled to said alternating voltage generator, and an output. A first selective amplifier, has an input electrically coupled to said output of the first electric signal compensator, and an output. A second selective amplifier has an input electrically coupled to said output of the second electric signal compensator, and an output. First and second data processors, have inputs connected to said outputs of the first and second selective amplifiers, and outputs. First and second recorders are connected to the outputs of the first and second data processors. A logic OR gate has a first and second inputs connected to said outputs of the first and second data processors, and an output. A signalling unit is connected to said output of said logic OR gate.

It is highly reasonable, that the angle between the main and the first supplementary loops and between the main and the second supplementary loops be within the range from 60° to 120°.

It is suitable, that the switch comprise seven keys and a key controller with the outputs thereof connected to the key control inputs.

It is preferable, that the key controller comprise connected in series rectangular pulse generator, ternary counter and decoder, three time delay circuits with the inputs thereof connected to the decoder outputs serving as the outputs of the key controller, and three logic AND gates with some inputs thereof connected to the decoder outputs, with the other inputs thereof connected to the outputs of the time delay circuits, and with the outputs thereof constituting the other outputs of the key controller.

This invention allows an improved productivity of search work by expanding the width of the coverage area and by scanning the site during a single scan.

Another advantage is that the reliability of metalliferous objects detection is improved, irrespective of their orientation relative to the search direction.

BRIEF DESCRIPTION OF ACCOMPANYING DRAWINGS

These and other objectives of the invention will become apparent from the following description of the invention and accompanying drawings, wherein.

Figure 3:
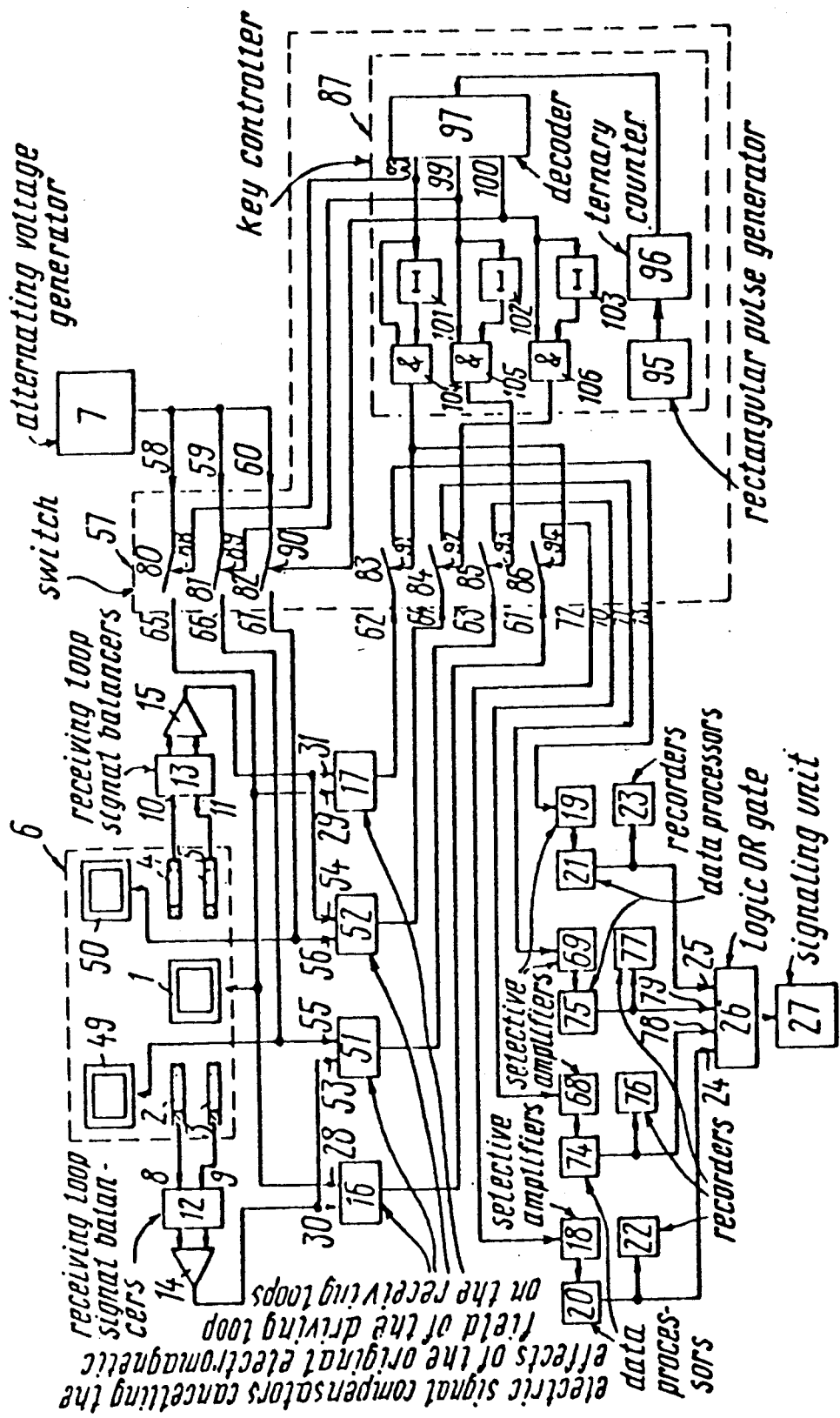
FIG. 3 shows the embodiment presented in FIG. 1 with three driving loops, according to the invention.

FIGS. 6a-p show the time diagrams illustrating the functioning of the switch for the embodiment shown in FIG. 3.

DETAILED DESCRIPTION

The detector of metalliferous objects comprises driving loop 1 (FIG. 1) and two pairs of receiving loops 2, 3 and 4, 5 constituting the integrated inductive system 6, and alternating voltage generator 7 connected to driving loop 1.

Receiving loops 2, 3 and 4, 5 are connected to, respectively, inputs 8, 9 and 10, 11 of receiving loop signal balancers 12, 13. Connected in series to balancers 12, 13 are, respectively, differential amplifiers 14, 15, electric signal compensators 16, 17 for cancelling the effect of the original electromagnetic field of the driving loop on receiving loops 2, 3 or 4, 5, respectively, selective amplifiers 18, 19, and data processors 20, 21, the outputs whereof are connected to recorders 22, 23 and to inputs 24, 25 of logic OR gate 26 with the output thereof connected to signalling unit 27.

Alternating voltage generator 7 drives control inputs 28, 29 of electric signal compensators 16, 17, the data inputs 30, 31 whereof are the outputs of differential amplifiers 14, 15.

Signal balancers 12, 13 are of like design and are intended to balance the signals arriving from receiving loops 2, 3 and 4, 5, respectively, when inductive system 6 is under the action of external interfering electromagnetic fields due to the electromagnetic parameters of receiving loops 2, 3 and 4, 5 being nonidentical.

Signal balancers 12, 13 may be designed along any of the known circuit arrangements and in the embodiment being described each single balancer comprises a phase shifter 32 with the input thereof constituting input 9 of balancer 12 or input 11 of balancer 13, potentiometer 33 connected across balancer 12 input 8 and one output or across balancer 13 input 10 and one output, and potentiometer 34 connected to the output of phase shifter 32 and to the other output of balancer 12 or 13.

Electric signal compensators 16, 17 are of like design and each comprises phase shifter 35 with the input thereof constituting control input 28 of compensator 16 or control input 29 of compensator 17, potentiometer 36 connected to the output of phase shifter 35, and differential amplifier 37 with an input thereof connected to potentiometer 36 and with the other input thereof constituting data input 30 of compensator 16 or data input 31 of compensator 17.

Selective amplifiers 18, 19 provide amplification of electric signals at the operating frequency of alternating voltage generator 7.

Data processors 20, 21 are designed with known in the art circuit arrangements and in this embodiment each comprises connected in series logarithmic amplifier 38 providing an expanded range of detectable object sizes without sensitivity tuning during searches, detector 39 and negative limiter 40 providing turning out of constant factors (equipment noise, vibration effects, etc.).

Recorders 22, 23 may be analogue or digital indicating meters (voltmeters).

Signalling unit 27 may be based on an acoustic signal source and an indicating lamp arranged into one of the known circuits and providing acoustic and visual signalling of the detection of a metalliferous object.

In this embodiment receiving loops 2, 3 (FIG. 2) and 4, 5 of inductive system 6 are identical and positioned relative to one another in coaxial and parallel pairs symmetrically relative to driving loop 1 to both sides of it. Driving loop 1 is in the plane of the common axes 41, 42 of receiving loops 2, 3 and 4, 5, respectively, connected into pairs and fitted to driving loop 1 by tie rods 43, 44, thus uniting inductive system 6 into a single structure.

This mutual arrangement of the driving and receiving loops 1, 2, 3, 4, 5 ensures minimal electromagnetic coupling between the driving loop and the receiving loops. Spacing $L_1$ between driving loop 1 and receiving loops 2, 3, 4, 5 is selected proceeding from the required stability of inductive system 6 as determined by the invariability of the arrangement of driving and receiving loops 1, 2, 3, 4, 5 and the specified geometric cancelling of the original electromagnetic field as set by the spacing between the driving and the receiving loops. As is known, all other conditions being equal, the greater is the spacing $L_1$, the higher is the degree of geometric cancelling, but the lower is the stability, so that $L_1$ is chosen for each specific application individually, proceeding from the expected application area (portable, vehicle-mounted) and structural requirements (materials available, fabrication methods) to ensure the specified coverage area width, stability and geometrical cancelling. The coverage area width will in any case exceed $2L_1$.

Figure 2:
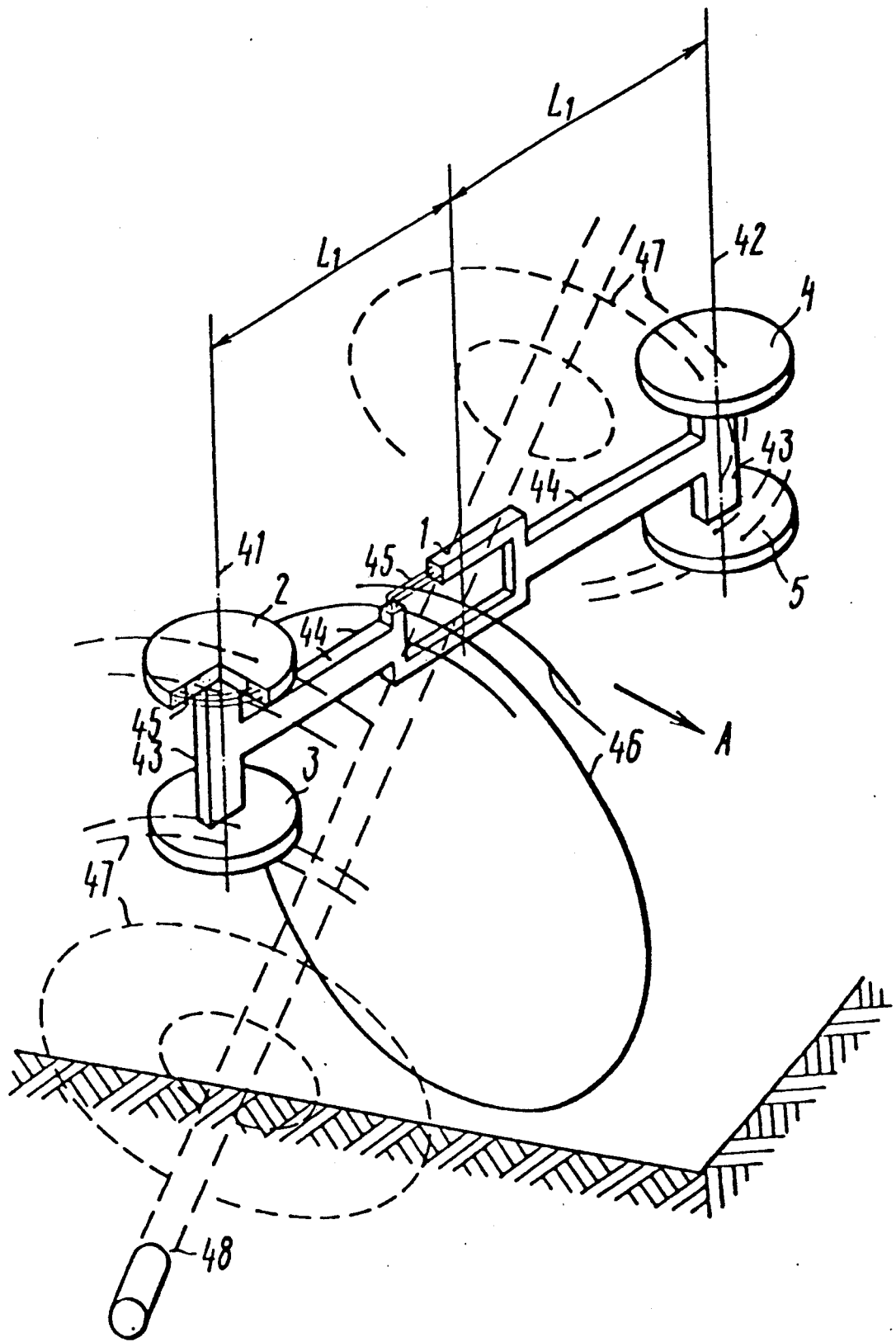
FIG. 2 shows the axonometric view of the layout of the receiving and driving loops, with conventionally denoted original and secondary electromagnetic fields and with a partial section along the driving and receiving loops of the embodiment presented in FIG. 1, according to the invention.

The driving and receiving loops 1, 2, 3, 4, 5 are of wires 45, the turns whereof are shown in FIG. 2, which also shows lines of force 46 of the original electromagnetic field generated by driving loop 1 in the coverage area in solid lines and lines of force 47 of the secondary electromagnetic field generated by underground metalliferous object 48 in dashed lines.

The search direction (movement of inductive system 6) is denoted by arrow A.

In another embodiment of the detector, to enable detection of metalliferous objects independent of their orientation relative to the search direction, the detector further comprises supplementary driving loops 49, 50 (FIG. 3), supplementary electric signal compensators 51, 52 cancelling the effect of the original electromagnetic field of supplementary driving loops 49, 50, respectively, on receiving loops 2, 3 and 4, 5 with their data inputs 53, 54 connected to the outputs of differential amplifiers 14, 15, respectively.

To provide consecutive connection of alternating voltage generator 7 to driving loops 1, 49, 50 and to control inputs 28, 29, 55, 56 of electric signal compensators 16, 17, 51, 52, this embodiment further comprises switch 57 with inputs 58, 59, 60 thereof connected to alternating voltage generator 7 and with inputs 61, 62, 63, 64 thereof connected to the outputs of electric signal compensators 16, 17, 51, 52. Switch 57 outputs 65, 66, 67 are connected to driving loops 1, 49, 50 and to control inputs 28, 29, 55, 56 of electric signal compensators 16, 17, 51, 52.

In this embodiment the metalliferous objects detector further comprises two selective amplifiers 68, 69 connected to outputs 70, 71 of switch 57 and having switch outputs 72, 73 connected, respectively, to the inputs of selective amplifiers 18, 19.

Switch 57 provides consecutive connection of the outputs of electric signal compensators 16, 17, 51, 52 to the inputs of selective amplifiers 18, 19, 68, 69 in accordance with driving loops 1, 49, 50 and control inputs 28, 29, 55, 56 of compensators 16, 17, 51, 52 connection to alternating voltage generator 7.

The metalliferous objects detector in this embodiment further comprises two data processors 74, 75 connected to the outputs of selective amplifiers 68, 69, respectively, and two recorders 76, 77 connected to the outputs of data processors 74, 75, connected also to supplementary inputs 78, 79 of logic OR gate 26.

Electric signal compensators 51, 52 are of like design to compensators 16, 17 and data processors 74, 75 are of like design to processors 20, 21.

In this embodiment switch 57 comprises seven keys 80, 81, 82, 83, 84, 85, 86 and key controller 87 connected to control inputs 88, 89, 90, 91, 92, 93, 94 of keys 80, 81, 82, 83, 84, 85, 86, with the inputs and outputs of keys 80, 81, 82 constituting, respectively, inputs 58, 59, 60 and outputs 65, 66, 67 of switch 57, the 61, 62, 63, 64 inputs whereof and the 72, 73, 70, 71 outputs whereof are the inputs and outputs of keys 86, 83, 85, 84, respectively.

Key controller 87 in this embodiment comprises connected in series rectangular pulse generator 95, ternary counter 96 and decoder 97, outputs 98, 99, 100 whereof are connected to time delay circuits 101, 102, 103 with the outputs thereof connected to inputs of logic AND gates 104, 105, the other inputs whereof are connected to outputs 98, 99, 100 of decoder 97. Outputs 98, 99, 100 of decoder 97 constitute control inputs 88, 89, 90 of keys 80, 81, 82 in switch 57 and the outputs of logic AND gates 104, 105, 106 serve as control inputs 91, 94, 93, 92 of switch 57 keys 83, 86, 85, 84, respectively.

In this embodiment controller 87 comprises rectangular pulse generator 95 generating a square wave, i.e. with a duty factor of 0.5, this ensuring driving loops 1, 49, 50 being connected to alternating voltage generator 7 for equal time intervals. The switching rate of generator 95 is set to 1/10 of the operating frequency of alternating voltage generator 7, this ensuring a duration of the time interval of driving loop connection to alternating voltage generator 7, sufficient for reliable detection of signals induced by the secondary electromagnetic field of the metalliferous object.

In this embodiment driving loops 49, 50 (FIG. 4) of inductive system 6 are positioned symmetrically and orthogonal to receiving loops 2, 3 and 4, 5 in the plane of their common axes 41, 42 and at an angle α to driving loop 1. Angle α is within the range from 60° to 120°, depending on the specific application.

With inductive system 6 fitted to a bracket on the vehicle, at its front, angle α is preferably 60° or 120° (FIG. 5) to ensure that the vehicle can move through traffic. In case of stringent requirements to inductive system 6 size, angle α between driving loop 1 and driving loops 49, 50 is set to 60°. Driving loops 49, 50 are at a distance of $L_2$ from axes 41, 42 of receiving loops 2, 3 and 4, 5 and are rigidly fitted to them by tie rods 43, 44, 44'.

Figure 4:
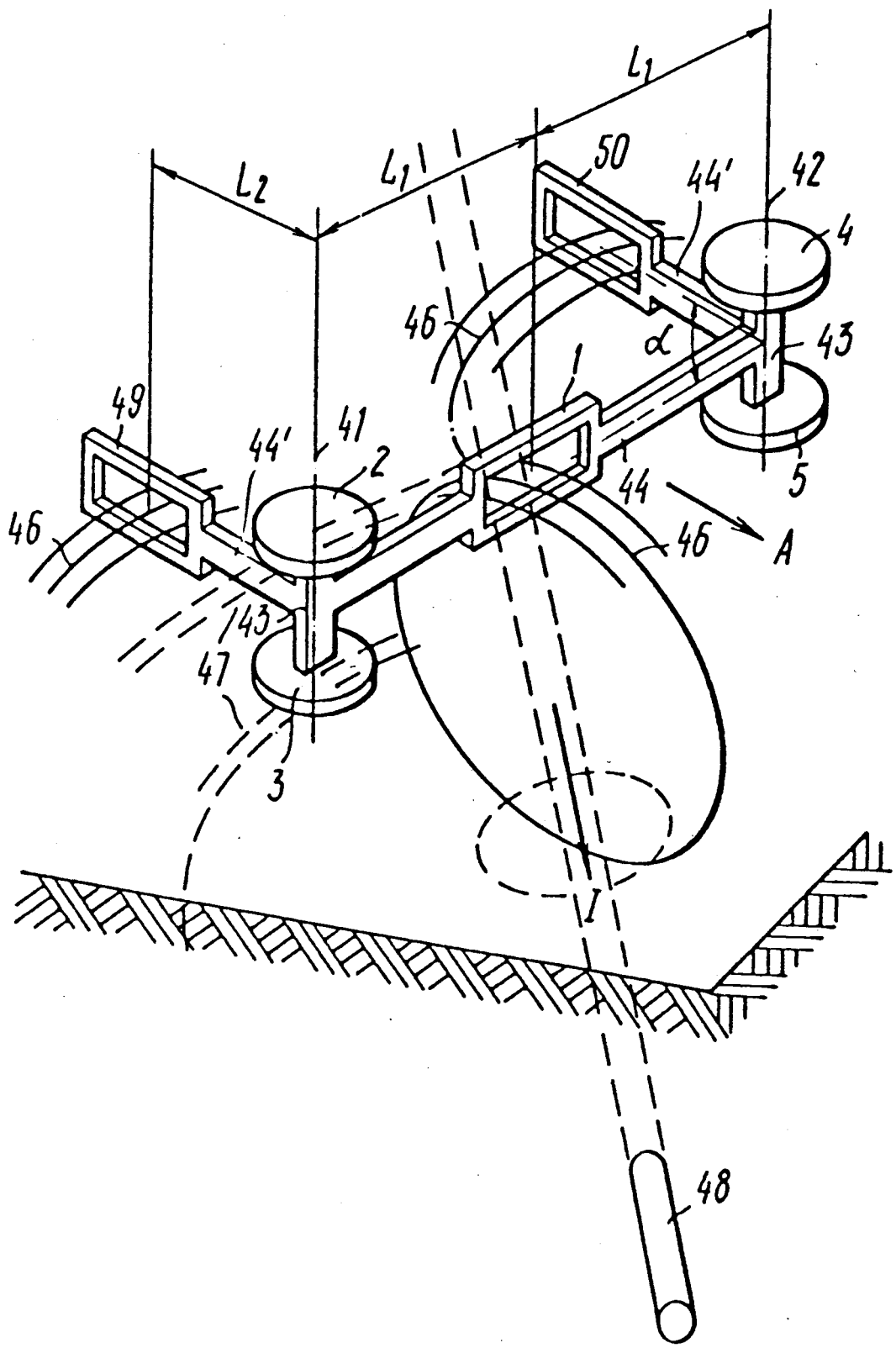
FIG. 4 shows the embodiment presented in FIG. 2, without the partial section along the driving and receiving loops, for the embodiment of FIG. 3, according to the invention.

For purposes of illustration, FIG. 4 shows lines of force 46 of the original electromagnetic field generated by all driving loops 1, 49, 50 simultaneously.

It should be noted, that driving loops 49, 50 are arranged to induce a minimally possible electromagnetic field in receiving loops 2, 3 and 4, 5.

A high reliability of metalliferous object 48 detection is ensured at any angle α within the specified range (60° to 120°), because the angle β between the object (for instance, service line) and tie rod 44 to one of the driving loops 1, 49, 50 is always less than 60°, this ensuring a sufficiently high signal induced in the service line.

Spacing $L_2$ between the driving and receiving loops 49, 50 and 2, 3; 4, 5, respectively, is selected, as in the case of spacing $L_1$, proceeding from the required stability and geometrical cancelling of the original electromagnetic field.

Figure 1:
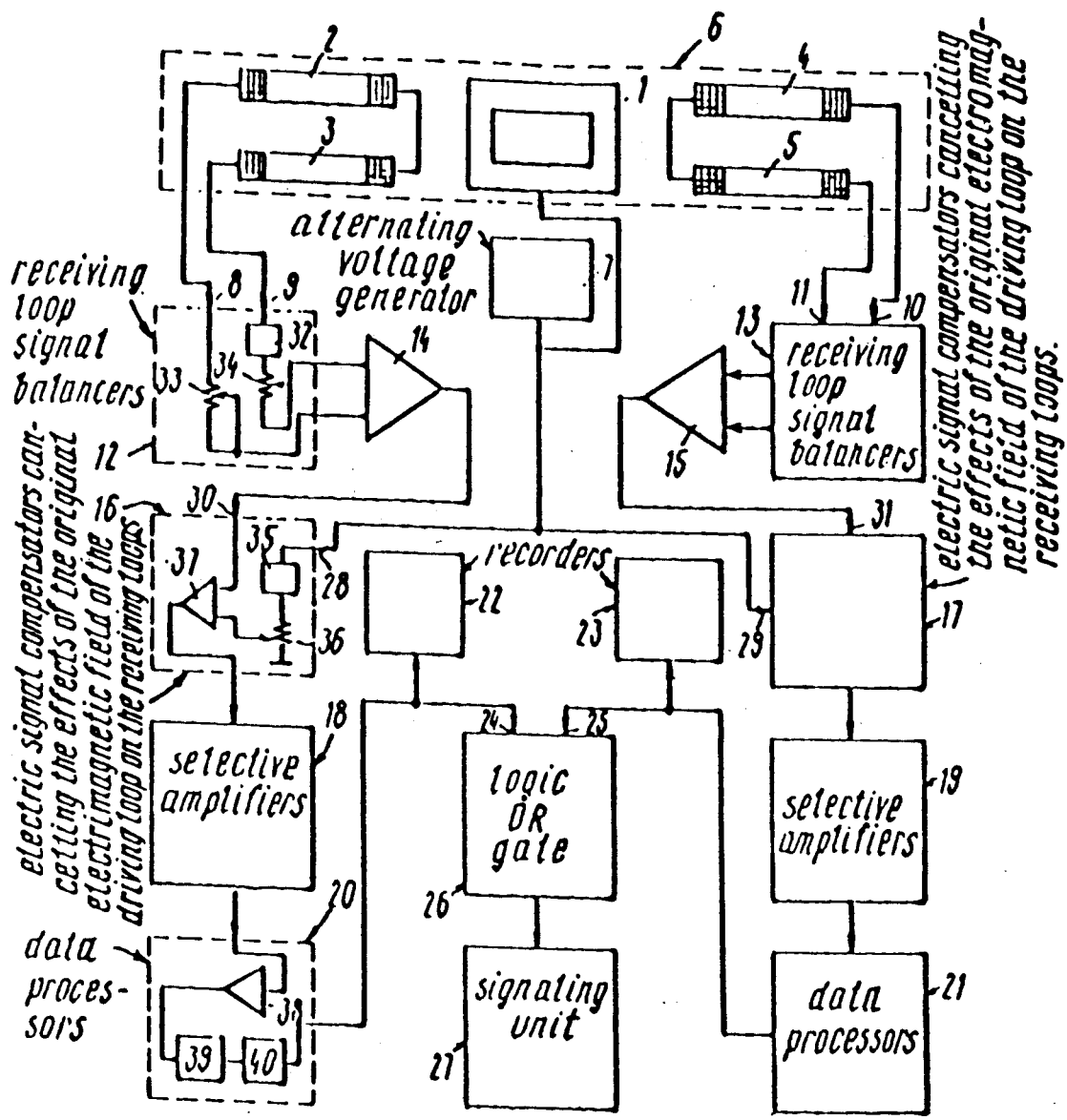
FIG. 1 shows the functional diagram of the metalliferous objects detector, according to the invention.
Figure 5:
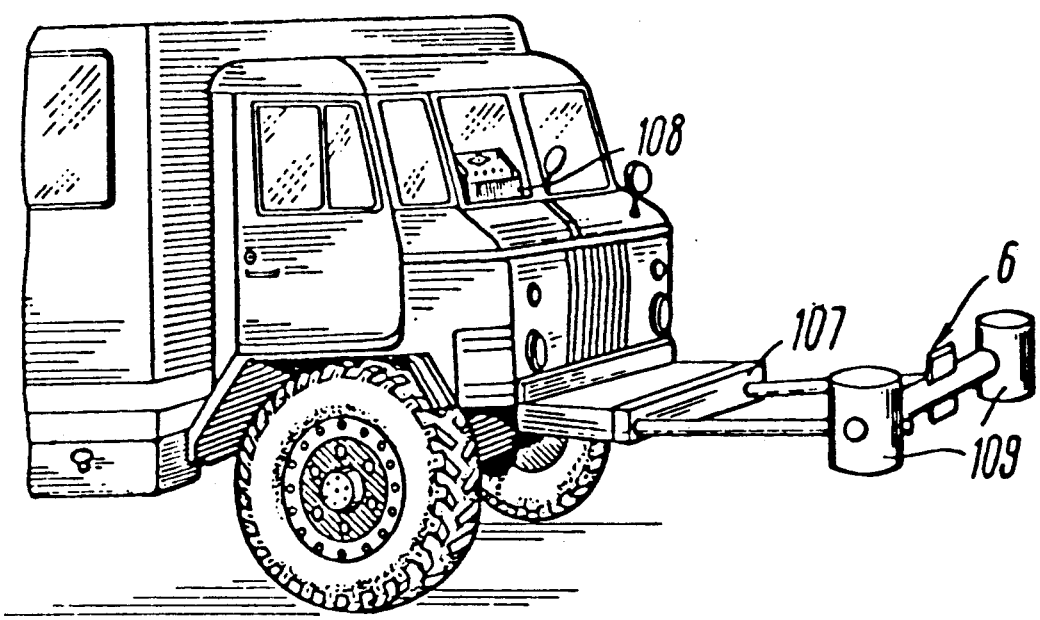
FIG. 5 shows the general view of an embodiment presented in FIG. 1 mounted onto a vehicle.

FIG. 5 shows the general view of the metalliferous objects detector designed as shown in FIG. 1 and installed on a vehicle. Inductive system 6 is mounted on the front bumper with the aid of bracket 107. The detector's electronic circuitry, including alternating voltage generator 7 (FIG. 1), is housed in case 108 (FIG. 5) and is located in the driver's cab, directly before the operator for convenience of observing the recorders 22, 23 (FIG. 1) readings. Receiving loops 2, 3 and 4, 5 are housed in cases 109.

The metalliferous objects detector of this invention will be better understood by studying the time diagrams of FIGS. 6a-p illustrating functioning of switch 57 (FIG. 3). Thus, FIG. 6(a) shows the time diagram of rectangular pulse generator 95 output signals $U_1$; FIG. 6(b,c,d) shows the output signals $U_2$, $U_3$, $U_4$ of decoder 97; FIG. 6(e, f, g) illustrates the output signals $U_5$, $U_6$, $U_7$ arriving from the time delay circuits 101, 102, 103; FIG. 6(h, i, j) presents the output signals $U_8$, $U_9$, $U_{10}$ of logic AND gates 104, 105, 106; FIG. 6(k,m,n,o,p) illustrates keys 80, 81, 82, 83, 84, 85, 86 states, with logic "1" corresponding to an open key and logic "0" corresponding to a closed key.

The metalliferous objects detector, according to the invention, functions as follows.

Prior to starting a search operation, the output signals from receiving loops 2, 3 and 4, 5 (FIG. 1) have to be balanced to ensure high interference immunity and detection of metalliferous objects. To this end, driving loop 1 is disconnected from alternating voltage generator 7, potentiometers 36 in electric signal compensators 16, 17 are set to zero, and inductive system 6 is submitted to the external electromagnetic field. As a source of such a field a loop, similar to driving loop 1, may be used by connecting it to generator 7 and placing it as symmetrically as possible relative to receiving loops 2, 3, 4, 5 at a distance of at least thrice the depth of metalliferous object detection, as determined by the available alternating voltage generator 7 power and the electromagnetic parameters of inductive system 6. After this the readings of recorders 22, 23 are zeroed as far as possible with the aid of potentiometers 33, 34.

Balancing is performed only if operating conditions are changed, for instance if the detector is installed on another vehicle, or if it was first used as a portable device and then installed on a vehicle, or vice versa.

Prior to each search session, electric signal compensators 16, 17 have to be adjusted to provide as complete a cancelling of signals induced in receiving loops 2, 3 and 4, 5 by the original electromagnetic field of driving loop 1 as possible, these signals remaining after geometric cancelling and differential connection of receiving loops 2, 3 and 4, 5. Compensators 16, 17 are adjusted at a site free of metalliferous objects as follows.

Gradually increasing the output signal of alternating voltage generator 7, the signal phase and amplitude in compensators 16, 17 are adjusted with the aid of phase shifter 35 and potentiometer 36 to obtain as near a zero reading of recorders 22, 23 as possible. This adjustment is continued until the output signal of generator 7 is set to its rated value.

In the absence of metalliferous objects, the output signal of compensators 16, 17 is approximately zero due to geometric and electric cancelling of the original electromagnetic field.

In the presence of metalliferous object 48 (FIG. 2) in the coverage area, the lines of force 46 of the original electromagnetic field of driving loop 1 enclose object 48 and induce a current in it, which in turn generates a secondary magnetic field, the lines of force 47 whereof pierce receiving loops 2, 3, 4, 5 of inductive system 6 and induce an electromotive force therein, this electromotive force being proportional to the distance of each receiving loop 2, 3, 4, 5 from metalliferous object 48. Since these distances are different, a difference signal is generated at the output of electric signal compensator 16 or 17 (FIG. 1), this signal varying with a change in distance (top view) between receiving loops 2, 3, 4, 5 and metalliferous object 48 (FIG. 2). The output signal of one of the compensators 16 or 17 is passed to its respective selective amplifier 18, 19 and from the output thereof to the input of its respective data processor 20, 21. Here, logarithmic amplifier amplifies the signal, and after detection it arrives at negative limiter 40. The output signal of data processors 20, 21 is passed to its respective recorder 22, 23 and to an input 24, 25 of logic OR gate 26, and from the output thereof to signalling unit 27.

The readings of indicating meters in recorders 22, 23 vary according to changes in the distance (top view) between receiving loops 2, 3, 4, 5 and metalliferous object 48 (FIG. 2). Signalling unit 27 (FIG. 1) generates light and audio signals, indicating detection of a metalliferous object.

Prior to operation, the detector of FIG. 3 should be tuned as described herein above, i.e. the signals from receiving loops 2, 3, 4, 5 balanced and electric signal compensators 16, 17, 51, 52 adjusted to maximum cancelling of signals induced in receiving loops 2, 3, 4, 5 by the original electromagnetic fields of driving loops 1, 49, 50. After this preoperational tuning the detector is ready for use.

Rectangular pulse generator 95 provides signals $U_1$ (FIG. 6a) of $\tau_1$ duration, passed to ternary counter 96 functioning as a frequency divider by three. The output signals of ternary counter 96 arrive at the inputs of decoder 97, wherein the binary coded signal from counter 96 is converted into a positional coded signal ($U_2U_3$, $U_4$ in FIGS. 6b,c,d) of $2\tau_1$ duration passed to control inputs 88, 89, 90 of keys 80, 81, 82, to the inputs of time delay circuits 101, 102, 103, and to some inputs of logic AND gates 104, 105, 106.

Time delay circuits 101, 102, 103 delay these signals by a time interval of $\tau_2$ and produce consecutive signals $U_5$, $U_6$, $U_7$ (FIGS. 6e,f,g) of $2\tau_1$ duration.

Keys 80, 81, 82 are triggered by control signals $U_2$, $U_3$, $U_4$ (FIG. 6b,c,d) from the outputs of decoder 97 and provide consecutive connection of driving loops 1, 49, 50 (FIG. 3) to alternating voltage generator 7 for a time interval of $2\tau_1$ (FIGS. 6k,l,m) via outputs 65, 66, 67 and inputs 58, 59, 60 of switch 57.

At the moment of time $t_1$ (FIG. 6a) switch 57 (FIG. 3) provides connection, for instance, of driving loop 1 and control inputs 28, 29 of electric signal compensators 16, 17 to alternating voltage generator 7; at the moment of time $t_2$ (FIGS. 6e,h) time delay circuit 101 and logic AND gate 104 are enabled and a signal of $2\tau_1 - \tau_2$ duration is passed to control inputs 94, 91 of keys 86, 83 in switch 57, these keys are triggered (FIG. 6h) and cause inputs 61, 62 (FIG. 3) and outputs 72, 73 of switch 57 to connect electric signal compensators 16, 17 to selective amplifiers 18, 19. At this time, electric signal compensators 51, 52 are disconnected from selective amplifiers 68, 69, so that, in other words, the first and second receiving channels comprising electric signal compensators 16, 17, selective amplifiers 18, 19, data processors 20, 21, and recorders 22, 23 are simultaneously in operation.

At the moment of time $t_3$ (FIG. 6a), the control signal from decoder 97 (FIG. 3) disables keys 80, 83, 86 (FIGS. 6k,n), this disconnecting driving loop 1 (FIG. 3) from generator 7 and selective amplifiers 18, 19 from electric signal compensators 16, 17. At the same time, key 81 is enabled (FIG. 6l) and connects driving loop 49 (FIG. 3) and control input 55 of electric signal compensator 51 to generator 7 via output 66 and input 59 of switch 57.

At the moment of time $t_4$ (FIGS. 6f,i), time delay circuit 102 and logic AND gate 105 are enabled and a logic "1" signal from the output of logic AND gate 105 is passed to control input 93 of key 85, triggering this latter and thus causing electric signal compensator 51 connection to selective amplifier 68 via input 63 and output 70 of switch 57. Thus, the third reception channel, composed of electric signal compensator 51, selective amplifier 68, data processor 74 and recorder 76, is established.

At the moment of time $t_5$ (FIG. 6a), switch 57 disconnects driving loop 49 from generator 7 and selective amplifier 68 from electric signal compensator 51, at the same time connecting (FIG. 6m) driving loop 50 and control input 56 of electric signal compensator 52 to generator 7.

At the moment of time $t_6$ (FIGS. 6j,p), a logic "1" signal from the output of logic AND gate 106 arrives at control input 92 (FIG. 3) of key 84 and enables it, causing electric signal compensator 52 to be connected to selective amplifier 69 via input 64 and output 71 of switch 57, this establishing the fourth reception channel of electric signal compensator 52, selective amplifier 69, data processor 75, and recorder 77.

Thereafter, this sequence of switching operations is repeated in the order described herein above.

The time interval $\tau_2$ (FIGS. 6e,f,g) by which the pulse sequence from generator 95 is delayed in time delay circuits 101, 102, 103 is a function of the duration of transients and should exceed the time of original electromagnetic field from driving loop 1, 49, 50 decay after its disconnection from generator 7.

The first, second, third and fourth reception channels are adjusted to generate a nearly zero output signal (on recorders 22, 23, 76, 77) in the absence of metalliferous objects in the coverage area.

In case of a metalliferous object 48 (FIG. 4) in the coverage area, the original electromagnetic field of one of the driving loops 1, 49, 50, the lines of force 46 whereof enclose metalliferous object 48, induces currents in it, in turn generating a second electromagnetic field, the lines of force whereof pierce receiving loops 2, 3, 4, 5 and induce electromotive forces in them proportional to the distance between each receiving loop 2, 3, 4, 5 and metalliferous object 48.

The output signal of electric signal compensators 16 (FIG. 3) or 17, or 51, or 52 are passed by switch 57 as described herein above to the inputs of respective selective amplifiers 18, 19 or 68 or 69. Functioning of the detector thereafter is as described herein above.

The productivity of search operations with the detector of this invention is by far superior to that with known like devices due to an expanded coverage area and scanning the search area during a single pass. Furthermore, the detector of this invention provides a higher reliability of metalliferous objects detection, irrespective of their orientation relative to the search direction.

What is claimed is:

1. A detector of metalliferous objects comprising:
a first driving loop generating an original electromagnetic field;
first, second, third and fourth receiving loops receiving the secondary electromagnetic field of a metalliferous object and rigidly fitted to said driving loop, with the first and second, third and fourth receiving loops mounted in pairs coaxially and parallel to one another, said driving loop located in the plane of the common axes of the first and second, third and fourth receiving loops symmetrical and orthogonal thereto;
an alternating voltage generator having an output electrically coupled to the first driving loop;
a first signal balancer to balance the signals from the first and second receiving loops, having inputs connected to the first and second receiving loops, and an output;
a second signal balancer to balance signals from the third and fourth receiving loops, having inputs connected to the third and fourth receiving loops, and an output;

a first differential amplifier, having an input connected to said output of the first signal balancer, and an output;

a second differential amplifier, having an input connected to said output of the second signal balancer, and an output;

a first electric signal compensator cancelling the effect of the original electromagnetic field of the first driving loop on the first and second receiving loops, having a data input connected to said output of the first differential amplifier, a control input electrically coupled to said alternating voltage generator, and an output;

a second electric signal compensator cancelling the effect of the original electromagnetic field of the first driving loop on the third and fourth receiving loops, having a data input connected to aid output of the second differential amplifier, a control input electrically coupled to said alternating voltage generator, and an output;

a first selective amplifier, having an input electrically coupled to said output of the first electric signal compensator, and an output;

a second selective amplifier, having an input electrically coupled to said output of the second electric signal compensator, and an output;

first and second data processors, having inputs connected to said outputs of the first and second selective amplifiers, and outputs;

first and second recorders connected to said outputs of the first and second data processors;

a logic OR gate, having a first and second inputs connected to said outputs of the first and second data processors, and an output;

a signalling unit connected to said output of said logic OR gate.

2. A detector as claimed in claim 1, comprising:

a second and third driving loops mounted at an angle to the first driving loop and generating original electromagnetic fields, with the second driving loop rigidly fitted to the first and second receiving loops and located symmetrically and orthogonal to them in the plane of their common axis, and with the third driving loop rigidly fitted to the third and fourth receiving loops and located symmetrically and orthogonal to them in the plane of their common axis;

a third electric signal compensator to cancel the effect of the original electromagnetic field of the second driving loop on the first and second receiving loops, having a data input connected to said output of the first differential amplifier, a control input and an output;

a fourth electric signal compensator to cancel the effect of the original electromagnetic field of the third driving loop on the third and fourth receiving loops, having a data input connected to said output of the second differential amplifier, a control input, and an output;

a third selective amplifier, having an input connected to said output of the third electric signal compensator, and an output;

a fourth selective amplifier, having an input electrically coupled to said output of the fourth electric signal compensator, and an output;

a switch, having first, second, third, fourth, fifth, sixth and seventh inputs, and first, second third, fourth, fifth, sixth and seventh outputs, with the first, second and third inputs connected to said output of the alternating voltage generator, with the fourth and sixth inputs connected to said outputs of the first and third electric signal compensators, with the fifth and seventh inputs connected to said outputs of the second and fourth electric signal compensators, with the first output connected to the first driving loop and to said control inputs of the first and second electric signal compensators, with the second and third outputs connected to the second and third driving loops, respectively and to said control inputs of the third and fourth electric signal compensators, and with the fourth, fifth, sixth and seventh outputs connected to said inputs of the first, second, third and fourth selective amplifier, this switch providing consecutive connection to said output of the alternating voltage generator of, first, the first driving loop and said control inputs of the first and second electric signal compensators and said outputs of these compensators to said inputs of the first and second selective amplifiers, next, the second driving loop and said control input of the third electric signal compensator and said output of this compensator to said input of the third selective amplifier, and then, the third driving loop and said control input of the fourth electric signal compensator to said input of the fourth selective amplifier;

third and fourth data processors, having inputs connected to said outputs of the third and fourth selective amplifiers, and outputs;

third and fourth recorders connected to said outputs of the third and fourth data processors, with said logic OR gate having a third and fourth inputs connected to said outputs of the third and fourth data processor.

3. A detector as claimed in claim 2, wherein the angle between the first and second, first and third driving loops is within the range from 60° to 120°.

4. A detector as claimed in claim 2, wherein said switch comprises:

a first, second, third, fourth, fifth, sixth and seventh keys having an input, a control input, and an output, with said inputs and outputs of the first, second, third, fourth, fifth, sixth and seventh keys constituting the first, second, third, fourth, fifth, sixth and seventh inputs and outputs of said switch;

a key controller to control switching of the first, second, third, fourth, fifth, sixth and seventh keys and having a group of outputs connected to respective said control inputs of the first, second, third, fourth, fifth, sixth and seventh keys, and providing, first, enabling of the first, fourth and fifth keys, next, enabling of the second and sixth keys and disabling of said first, fourth and seventh keys, and then, enabling of the third and seventh keys and disabling of the second and sixth keys.

5. A detector as claimed in claim 4, wherein said key controller to control the switching of the first, second, third, fourth, fifth, sixth and seventh keys comprises:

a rectangular pulse generator having an output;

a ternary counter having an input connected to said output of said rectangular pulse generator, and an output;

a decoder having an input connected to said output of said ternary counter and a first, second and third outputs constituting the said control inputs of the first, second and third keys;

a first, second and third time delay circuits, having inputs connected to the first, second and third outputs of said decoder, and outputs;

a first, second and third logic AND gates having each a first and second inputs connected to the first, second and third outputs of said decoder and to said outputs of the first, second and third time delay circuits, and an output, with said output of the first logic AND gate constituting the control inputs of the fourth and fifth keys and with said outputs of the second and third logic AND gates constituting the control inputs of the sixth and seventh keys.

* * * * *